United States Patent
Oglesby

(12) 
(10) Patent No.: US 6,948,397 B1
(45) Date of Patent: Sep. 27, 2005

(54) REPLACEMENT OIL PUMP GEAR FOR MOTORCYCLE ENGINE AND METHOD OF REPLACING OIL PUMP GEAR

(76) Inventor: Robert Oglesby, 1870 Mayne Mill Rd., Watkinsville, GA (US) 30677

( * ) Notice: Subject to any disclaimer, the term of this patent is extended or adjusted under 35 U.S.C. 154(b) by 0 days.

(21) Appl. No.: 09/951,525

(22) Filed: Sep. 14, 2001

Related U.S. Application Data

(60) Provisional application No. 60/232,513, filed on Sep. 14, 2000.

(51) Int. Cl.[7] .................................. F16H 1/00
(52) U.S. Cl. .............. 74/431; 74/431 R; 29/893.2; 29/402.08
(58) Field of Search ............... 74/451, 421 R, 74/431; 29/402.01, 402.03, 402.08, 893.1, 29/893.2

(56) References Cited

U.S. PATENT DOCUMENTS 1,648,200 A * 11/1927 Schulze ............... 403/333
1,803,136 A *  4/1931 Schulze ............... 403/253

* cited by examiner

Primary Examiner—William C. Joyce
(74) Attorney, Agent, or Firm—Blank Rome LLP

(57) ABSTRACT

When a plastic oil pump gear in a motorcycle engine needs to be replaced, first, the gear is removed from its shaft. A keeper is inserted into the slots in the shaft that originally held the plastic gear. A steel gear is screwed onto the keeper so as to be mounted on the shaft through the keeper in place of the plastic oil pump gear.

2 Claims, 1 Drawing Sheet

REPLACEMENT OIL PUMP GEAR FOR MOTORCYCLE ENGINE AND METHOD OF REPLACING OIL PUMP GEAR

REFERENCE TO RELATED APPLICATION

The present application claims the benefit of U.S. Provisional Application No. 60/232,513, filed Sep. 14, 2000, whose disclosure is hereby incorporated by reference in its entirety into the present disclosure.

FIELD OF THE INVENTION

The present invention is directed to a gear and a keeper for mounting the gear onto a shaft and more particularly to such a gear and keeper for replacing a defective oil gear in a motorcycle. The present invention is further directed to a method of replacing a gear.

DESCRIPTION OF RELATED ART

From 1987 through 1999, all Kawasaki Vulcan 1500 models, except the Drifter, were built with a plastic oil pump gear. Several Vulcan 1500's have experienced failures of these plastic gears, causing varying degrees of damage to their engines. Failure rates have varied from model to model. In total, the percentage of Vulcan 1500's experiencing the failures has been low, but significant enough to cause serious concern among owners. Failures have a tendency to occur at inopportune times, many miles from home. The known fix for the oil pump gear (OPG) failure is very complex, requiring engine disassembly and a split in the transmission case to repair a failed OPG. One reason why the OPG is so difficult to replace is that it is molded onto a part of the shaft that has two slots. Replacing the gear so that the two slots retained the new gear would ordinarily require molding a new gear in place.

Beginning in 2000, Kawasaki changed the design to a metal gear on the 1500 Vulcan models. However, before the present invention, a satisfactory solution for existing oil pump gears has not been known.

SUMMARY OF THE INVENTION

It will be readily apparent from the above that a need exists in the art for a simple and reliable way to replace such oil gears. It is therefore an object of the invention to provide a gear that can easily be mounted on a shaft in the place of the gear that was there originally. It is another object of the invention to provide, more generally, a gear that can easily be mounted on a shaft.

To achieve the above and other objects, the present invention is directed to a combination of a keeper for mounting on the shaft and a gear for mounting on the keeper. The keeper is mounted on the shaft, e.g., by engaging the keeper with the slots on the oil pump gear shaft. Screws then mount the gear on the keeper. The invention is further directed to a method for installing the gear on the shaft by use of the keeper.

Thus, the gear can be mounted on the shaft without the need for a direct engagement between the gear and the shaft, so that installation is simplified. Also, while the invention has particular utility in replacing the oil pump gears in the above-noted Kawasaki motorcycles, it can be used in many other situations in which it is desired to mount a gear on a shaft.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

Figure 1A:
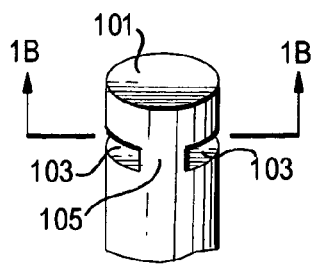
FIGS. 1A and 1B show an oil pump gear shaft on which the gear of the preferred embodiment is to be installed.

A preferred embodiment of the present invention will now be set forth in detail with reference to the drawings, in which like reference numerals refer to like components throughout.

Figure 1B:
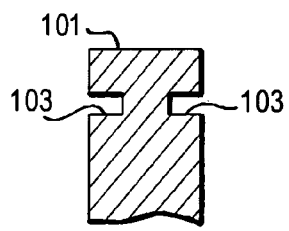

A motorcycle engine in which the gear of the preferred embodiment is to be installed has an oil pump gear shaft on which the original plastic oil pump gear is mounted. FIG. 1A shows a plan view of the end portion of such a shaft 101, while FIG. 1B shows a cross-sectional view of the same portion of the shaft 101 taken along the lines IB—IB of FIG. 1A. As shown, the shaft 101 has slots 103 machined on either side thereof to retain the plastic oil pump gear (not shown). The curved surface 105 of the shaft 101 extends between the slots 103. As mentioned above, the plastic oil pump gear is molded in place on the shaft 101 so that the plastic extends into the slots 103.

Figure 2:
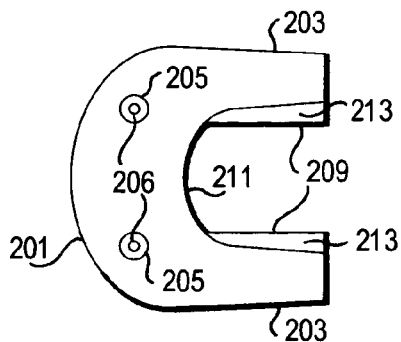
FIG. 2 shows a keeper for mounting on the oil pump gear shaft of FIGS. 1A and 1B.

FIG. 2 shows a keeper 201 to be installed on the shaft 101 once the plastic oil pump gear has been removed. The keeper 201 is a U-shaped object with arms 203 and threaded screw holes 205, each having a beveled portion 206. The arms 203 define a space 207 bounded by two flat surfaces 209 and a curved surface 211. The keeper 201 is machined to fit snugly into the slots 103 of the shaft 101, such that the flat surfaces 209 are engaged in the slots 103 and the curved surface 211 mates with the curved surface 105. Recessed portions 213 are provided to allow portions of the arms 203 to extend around the shaft 101. The keeper can be machined to incorporate a feeler gauge to determine whether the keeper will fit into the slots 103 of the particular shaft 101, since the manufacturing tolerance varies among motorcycle models. If the keeper does not fit, it can be thinned through sanding so that it fits.

Figure 3A:
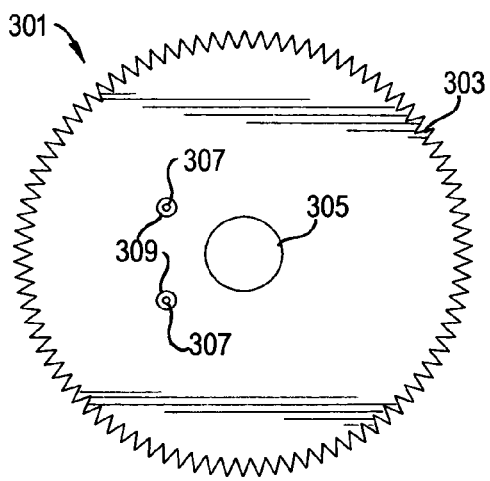
FIGS. 3A and 3B show a gear for mounting on the keeper of FIG. 2.
Figure 3B:
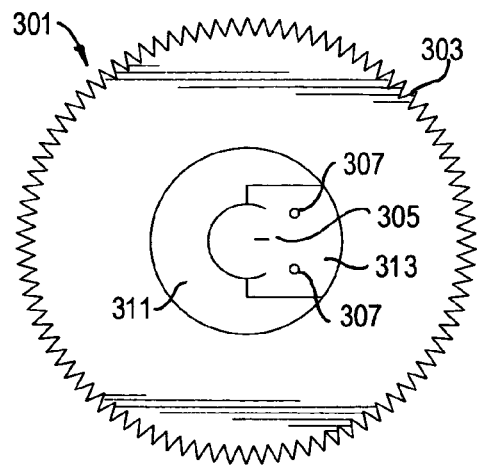

FIGS. 3A and 3B show front and back views, respectively, of a replacement oil pump gear 301. The gear 301 has teeth 303 corresponding to the teeth of the plastic gear that it replaces. The gear also has a central opening 305 to accommodate the shaft 101 and screw holes 307 corresponding to the threaded screw holes 205 of the keeper 201. On the front side of the gear 301, each screw hole 307 is surrounded by a beveled portion 309. The back side of the gear 301 has a protruding portion 311 and a recess 313 of a shape and depth to accommodate the keeper 201.

Figure 4:
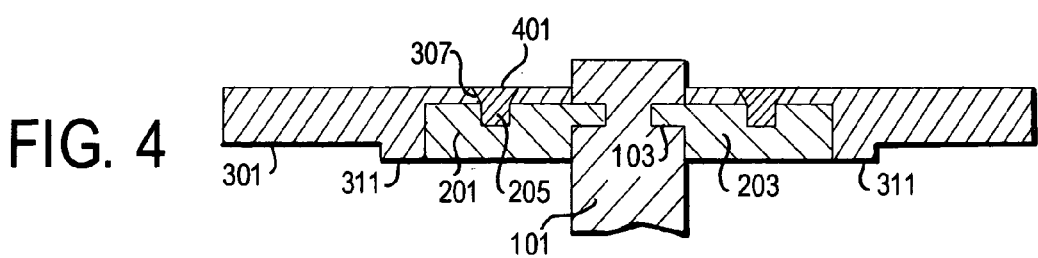
FIG. 4 shows a cross-sectional view of the oil pump gear shaft of FIGS. 1A and 1B, the keeper of FIG. 2, and the gear of FIGS. 3A and 3B assembled together.

To install the gear 301, first, the keeper 201 is inserted into the slots 103 of the shaft 101. Then, the gear 301 is fitted onto the keeper 301, and screws are screwed into the screw holes 307 and 205 to retain the gear on the keeper. A cross-sectional view of such an arrangement, with screws 401, is shown in FIG. 4. The screws 401 can be of any suitable type, but are preferably of the type for use with a hexagonal wrench (of the type sold under the trade name "Allen wrench"). Alternatively, fasteners other than screws can be used.

While the present invention can be used in any situation in which it is desired to attach a gear to a shaft, it is contemplated that the invention will have particular utility in replacing oil pump gears on the above-noted motorcycle models. Therefore, an illustrative example in which the gear is replaced in a 1998 Kawasaki Vulcan 1500 Classic will now be set forth. It should be understood that the present example is illustrative rather than limiting. The following instructions should be followed in conjunction with the shop manual for the motorcycle on which they are to be carried out.

1. Disassembly to access the clutch:

Using an 8 mm socket, remove the chrome cover over the rear brake fluid reservoir. Using the 8 mm socket, remove the bolt that attaches the brake fluid reservoir to the frame. There is a rubber-covered nut that the reservoir bolt screws into to attach it to the frame. Remove that nut from the frame so it does not get lost.

Using cutters, cut the ties that attach the wire bundle to the frame upright. If you have the Fire & Steel engine guard, it will have to be removed because an attachment point is on the removable frame member section.

Using a 14 mm socket, remove the two bolts that attach the right floorboard assembly to the frame. You will have to detach the rear brake light switch in order to swing the floorboard assembly out of the way.

At this point you may consider an alternative method. You can leave the floorboard assembly intact, remove the upper frame member Allen bolts, loosen the back frame member Allen bolts and swing the frame member and floorboard assembly far enough out of the way to remove the clutch cover and perform the work. Depending on the type of exhaust system you have, you will probably have to remove some or all of it.

Using an Allen wrench and 14 mm wrench, remove the bolts that attach the removable right frame member. There are two Allen bolts on each end of the frame member. Using a 12 mm socket, remove the two engine mount bolts attached to the removable frame member. The removable frame member can now be removed.

Using an 8 mm socket, remove the 17 bolts that attach the clutch cover. Be careful and do not mix up the bolts as they are of varying lengths. The best way to do this is to lay out a clean surface like a towel and carefully lay the bolts in order as you take them off in a clockwise manner around the cover. Remember which bolt hole you started with so you can reinstall them in the exact same order.

When you remove all of the clutch cover bolts, the cover will be stuck to the engine. Pry gently against the cover to break the seal and remove the cover from the engine. When you remove the cover, a thrust washer will either fall off or be stuck to the inside of the cover. Get the thrust washer and place it back on the appropriate shaft now so you will not forget it later.

2. Disassembly of clutch:

Using a screwdriver to carefully pry, remove the operating plate retainer ring (snap ring). In the second picture you will see a slot where a screwdriver can be used to pry under the ring to get it started.

Remove the operating plate. Remove the push piece and bearing from the center of the clutch.

Use a clean cloth to carefully lay out the parts in the exact order that they are removed. This makes reassembly much easier.

Using an impact wrench and a 27 mm socket, remove the clutch nut. If you do not have an impact wrench, the clutch nut is difficult but not impossible to remove.

After the nut is removed, you can now remove the operating plate, spring holder, springs (including the large clutch spring and the back torque limiter springs) and the clutch spring plate. Carefully lay them out in the proper order.

At this point, if you are careful, you can remove the entire clutch basket with all parts intact. Place a hand behind the basket to make sure all parts come out together and gently move them off of the shaft while holding all the parts together. They can then be reinstalled, intact, in reverse order.

Handling the clutch basket as one assembly makes the job easier. However, the clutch assembly can be disassembled if it is desired, e.g., if some component in the clutch assembly needs to be replaced at the same time.

Carefully begin to remove the friction plates and steel plates. The friction plates and steel plates alternate through the clutch. Please note at this time that the first friction plate is in a different set of slots from the rest of the friction plates. This is easy to miss on reassembly so don't forget it. Lay the plates down in the exact order they are removed so they can be reassembled in the same order.

You can now remove the outer hub. After the outer hub is removed you can carefully place your fingers behind the rest of the clutch basket assembly and pull the rest of the clutch assembly off of the shaft. There will be several parts attached to the clutch basket (outer housing) including the sleeve and bearings. Carefully lay all of the parts in order to make reassembly easier.

3. Replacing plastic oil pump gear:

Place a rag into the holes under the oil pump gear so that debris or parts do not fall into the bottom of the engine.

Using a small pair of locking pliers, grasp each side of the plastic gear. Do not place either inward or outward pressure on the gear and shaft while prying the gear to break it. Some gears break easily, while others are difficult to break and come off in chucks. Be careful not to pull out or press in on the gear shaft so that you do not damage the circlip that is inside the case on the shaft. This part is critical because if you damage the circlip, your engine will have to be disassembled.

If the gear does not break cleanly from the shaft, a dremel cutting tool can be used to cut slots in the remaining part of the gear on opposing sides of the shaft. Do not cut all the way to the metal shaft. Two screwdriver blades can be inserted in the slots to apply pressure to split the gear. There is a thrust washer behind the gear. Remove it at this time so you can clean up.

After everything is cleaned, it is now time to start installing the steel oil pump gear. Start by installing the thrust washer on the shaft. A trial assembly is carried out for sizing. Slip the keeper in to the slots on the shaft. Note that the holes in the keeper are recessed on one side (beveled portions 206 in FIG. 2). This is very important. The recessed holes must be facing outward toward you. Slide the keeper fully onto the shaft. Make sure you still have a rag covering the openings to the bottom of the engine so that you don't drop anything down them. There are slight differences in the shaft, so the keeper has very tight tolerances. You may have to gently file a little of the inside of the keeper to allow it to insert onto the shaft. If you have to file it, do not open it too much. It needs to be a snug fit on the shaft.

Install the gear onto the keeper and make sure everything fits properly. Make sure that the gear can turn without touching the boss behind the gear, i.e., the gear must clear of the engine housing when turning. If there is not enough clearance, you may have to buy and install a second thrust washer to gain additional clearance. Remove the metal gear parts.

At this point, you are ready for final assembly. The first step is to degrease all parts so that an adhesive material (e.g., the material sold under the name Loctite, and particularly red Loctite) can adhere to all parts. Lacquer thinner can be used to clean the gear, keeper, and shaft. After the parts are degreased, be careful not to touch the mating surfaces with your fingers because the adhesive may not stick if the surface is oily.

Apply the adhesive to the keeper inner surfaces and slide it onto the shaft as you did in the trial assembly. Make sure you have re-installed the thrust washer onto the shaft behind the keeper. After the keeper is on the shaft, put the adhesive onto the mating surface of the gear where the gear will attach to the keeper.

Warning: Do not overdo it with the adhesive. You can accidentally adhere the keeper to the thrust washer. Insure that excess adhesive is wiped off and that the keeper is not glued to the thrust washer by excess adhesive. After the adhesive sets up, it will be extremely difficult to get the thrust washer and keeper apart if you have accidentally glued them together. This warning is here because this is very easy to do. One suggestion is for you to coat the thrust washer with petroleum jelly to prevent the adhesive from adhering to it while you mount the keeper.

After the keeper and gear are on the shaft, wipe off excess adhesive. Apply the adhesive to the threads of the screws and using the 5/64 Allen wrench, install and tighten the screws. Be careful not to overtighten and strip the threads. Wipe off excess adhesive.

4. Reassembly:

Slide the sleeve onto the clutch shaft and then slide the bearing onto the sleeve. Slide the outer housing (clutch basket) onto the shaft and then install the thrust washer.

Install the inner hub and the outer hub. Install the plates, alternating between metal and friction plates. Install them in the order in which you removed them. Remember, the last friction plate goes in a different slot than all the others.

Install the clutch spring plate. Assemble the springs on the spring holder. The large clutch spring goes on first. The 3 small torque limiter springs go on next. Here is where you can make a common mistake in clutch assembly. The Kawasaki manual is incorrect in the mounting of the torque limiter springs. They are cupped springs and must go in the order like this ")( )", not "))) "as the Kawasaki manual states. If you do not install these correctly, the clutch will fail prematurely.

The torque limiter springs are difficult to assemble because they are loose. Use petroleum jelly to hold them together while you assemble them.

Install the spring assembly being careful that all of the springs are in place. Install the clutch nut back into place and torque to 110 ft. lbs.

Install the "push piece" and bearing assembly into the center hole. Note that it will be pushing against a shaft that is under pressure. You may have to push hard on the Push Piece to get it pushed in far enough to install the Operating plate.

Install the operating plate. Install the retainer ring (snap ring). The clutch is now assembled. Insure the thrust washer is still in place.

Clean the old gasket material from the mating surfaces of the cover and engine case. The studs help to guide the case back onto the engine and get a good gasket seal. Reinstall the cover and all bolts in the order they were removed. Torque the cover bolts to 87 inch lbs.

Reinstall the frame member, floorboard assembly, and brake reservoir assembly. Make sure the rear brake line is routed properly when installing the frame member. Reinstall your exhaust pipe, using a new crush washer if necessary.

While a preferred embodiment has been set forth above, those skilled in the art will recognize that other embodiments can be realized within the scope of the present invention. For example, the keeper can be adapted to the needs of the particular shaft on which the gear is to be installed. As one particular example, if the shaft has a keyhole extending through the shaft, the keeper can be adapted to extend all of the way through the keyhole. Other configurations of the shaft can be accounted for in similar ways. Therefore, the present invention should be construed as limited only by the appended claims.

I claim:

1. A method of replacing a first gear that is integrally molded to a shaft having a slot with a second gear, the method comprising:
    (a) removing the integrally molded first gear from the shaft having the slot;
    (b) directly mounting a keeper in the solt formed on the shaft; and
    (c) mounting the second gear on the keeper, whereby the second gear is mounted on the shaft through the keeper.

2. The method of claim 1, wherein:
    the keeper has at least one screw hole for receiving a screw;
    the second gear has at least one screw hole, corresponding to the at least one screw hole of the keeper, for receiving the screw to mount the second gear on the keeper by use of the screw; and
    step (c) comprises mounting the second gear on the keeper by use of the screw.

* * * * *